US011181919B2

(12) United States Patent
Sarkar et al.

(10) Patent No.: US 11,181,919 B2
(45) Date of Patent: Nov. 23, 2021

(54) METHOD AND SYSTEM FOR DETERMINING AN OPTIMAL TRAJECTORY FOR NAVIGATION OF AN AUTONOMOUS VEHICLE

(71) Applicant: WIPRO LIMITED, Bangalore (IN)

(72) Inventors: Manas Sarkar, Barasat (IN); Balaji Sunil Kumar, Bengaluru (IN)

(73) Assignee: Wipro Limited, Bangalore (IN)

( * ) Notice: Subject to any disclaimer, the term of this patent is extended or adjusted under 35 U.S.C. 154(b) by 379 days.

(21) Appl. No.: 16/261,645

(22) Filed: Jan. 30, 2019

(65) Prior Publication Data

US 2020/0166940 A1     May 28, 2020

(30) Foreign Application Priority Data

Nov. 27, 2018  (IN) ............................. 201841044648

(51) Int. Cl.
*G05D 1/02* (2020.01)
*G05D 1/00* (2006.01)
*B60W 60/00* (2020.01)

(52) U.S. Cl.
CPC ....... *G05D 1/0214* (2013.01); *B60W 60/0011* (2020.02); *G05D 1/0088* (2013.01); *G05D 1/0223* (2013.01); *G05D 2201/0213* (2013.01)

(58) Field of Classification Search
None
See application file for complete search history.

(56) References Cited

U.S. PATENT DOCUMENTS 6,926,374 B2 * 8/2005 Dudeck .................... B60T 7/22
                                                     303/191
9,244,462 B2    1/2016 Pedersen
(Continued)

FOREIGN PATENT DOCUMENTS

CN          104933228 B     3/2018

OTHER PUBLICATIONS

Altche, F., et al., "High-Speed Trajectory Planning for Autonomous Vehicles Using a Simple Dynamic Model", IEEE 20th International Conference on Intelligent Transportation (2017), 7 pages.
(Continued)

*Primary Examiner* — Alan D Hutchinson
*Assistant Examiner* — Andy Schneider
(74) *Attorney, Agent, or Firm* — Finnegan, Henderson, Farabow, Garrett & Dunner, LLP

(57) ABSTRACT

Disclosed subject matter relates to a field of vehicle navigation system that performs a method for determining an optimal trajectory for navigation of an autonomous vehicle. A trajectory determining system associated with the autonomous vehicle may detect an occurrence of a predefined condition related to diversion based on environment data. Further, minimum lateral shift required from a predefined distance for handling the detected predefined condition is determined and co-efficient value sets corresponding to the minimum lateral shift are determined based on pre-stored values that are generated based on a trial run. For each co-efficient value set, velocity and position data is determined at a plurality of time instances based on which one or more trajectories corresponding to each co-efficient value set are generated. Finally, an optimal trajectory is determined among the generated trajectories cumulative variation in orientation and total time required for navigating along the corresponding trajectory.

17 Claims, 9 Drawing Sheets

(56) References Cited

U.S. PATENT DOCUMENTS

| | | | |
|---|---|---|---|
| 10,754,339 B2* | 8/2020 | Zhu | B60W 30/16 |
| 2009/0093960 A1* | 4/2009 | Puhalla | B60W 40/076 |
| | | | 701/301 |
| 2018/0150080 A1 | 5/2018 | Gross et al. | |

OTHER PUBLICATIONS

Gu, T., et al., "On-Road Trajectory Planning for General Autonomous Driving with Enhanced Tunability". Intelligent Autonomous Systems (2015), pp. 1-13.

Nordell, B., "Trajectory Planning for Autonomous Vehicles and Cooperative Driving", KTH Vetenskap Och Konst (2016), 45 pages.

Rahatgaonkar, A., "Velocity Planning Approach for Autonomous Vehicles", Chalmers University of Technology (2015) 97 pages.

Solea, R., "Trajectory Planning with Velocity Planner for Fully-automated Passenger Vehicles", IEEE Intelligent Transportation Systems Conference, Sep. 17-20, 2006, pp. 474-480.

Qian, X., et al., "Optimal Trajectory Planning for Autonomous Driving Integratinig Logical Constraints: An MIPQ Perspective", IEEE 19th International Conference on Intelligent Transportation (ITSC), Nov. 1-4, 2016.

Xiu, C., et al., "A Behavior-Based Path Planning for Autonomous", ResearchGate, Nov. 2010, 10 pages.

\* cited by examiner

METHOD AND SYSTEM FOR DETERMINING AN OPTIMAL TRAJECTORY FOR NAVIGATION OF AN AUTONOMOUS VEHICLE

TECHNICAL FIELD

The present subject matter relates generally to the field of vehicle navigation system, and more particularly, but not exclusively to a method and a system for determining an optimal trajectory for navigation of an autonomous vehicle.

BACKGROUND

Generally, vehicles make use of a navigation path for navigating from a source point to a destination point. Nowadays, the navigation path is widely used in autonomous vehicle technology for navigating autonomous vehicles. The autonomous vehicle technology aims to reduce energy consumption, pollution, reduce frequency of crashes and congestion thereby providing increased road safety. The autonomous vehicles are the vehicles that are capable of sensing environment around them for moving on the road without any human intervention. The autonomous vehicles sense the environment with help of sensors configured to work in systems such as Light Detection and Ranging (LIDAR) system, Image capturing devices, Global Positioning System (GPS) and the like.

Few existing techniques may disclose trajectory planning systems that generate different trajectories based on situation on cross sections of road and trajectory of other moving objects on the road. Further, based on cost of the generated trajectories, the existing techniques may select the best trajectory for navigation. Cost is a generic term used in autonomous vehicle domain related to trajectory planning, which indicates an overall measure of inconvenience faced by the autonomous vehicle when navigating along a certain trajectory. However, parameters chosen by different existing techniques for determining cost of the trajectory may be different. These existing techniques depend on trajectories of other moving objects on the road to determine the trajectory for navigation. This feature may be a limitation due to its generic nature i.e. the feature does not consider performance or address specific needs of the autonomous vehicle while determining the trajectory for navigation. Further, the trajectory is determined in these techniques for avoiding the obstacles based on parameters such as occupant comfort and energy usage but does not consider parameters such as terrain conditions, lateral shift of the autonomous vehicle and total time taken to travel along the trajectory which are crucial for navigation of the autonomous vehicle.

Few other existing techniques disclose methods for reducing length of a generated trajectory such that lateral acceleration is controlled when the autonomous vehicle takes a turn on the road. However, these techniques are limited only to a specific scenario i.e. taking a left or a right turn on the road, but not applicable for various other scenarios such as avoiding obstacles, changing lanes, overtaking other vehicles on the road and the like.

The information disclosed in this background of the disclosure section is only for enhancement of understanding of the general background of the disclosure and should not be taken as an acknowledgement or any form of suggestion that this information forms prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of determining an optimal trajectory for navigation of an autonomous vehicle. The method includes detecting, by a trajectory determining system associated with an autonomous vehicle, an occurrence of a predefined condition related to diversion of the autonomous vehicle from a planned navigation path, based on environment data received from one or more sensors configured in the autonomous vehicle. Further, the method includes determining a minimum lateral shift required from a predefined distance for handling the detected predefined condition. Upon determining the minimum lateral shift, the method includes determining one or more co-efficient value sets corresponding to the minimum lateral shift by comparing the minimum lateral shift with pre-stored values. The pre-stored values are generated based on a trial run of the autonomous vehicle under one or more predefined trial conditions of the autonomous vehicle. Subsequently, the method includes determining for each of the one or more co-efficient value sets, a linear velocity and an angular velocity at a plurality of time instances using each of the one or more co-efficient value sets, and position co-ordinates and orientation at the corresponding time instances using the corresponding linear velocity and the corresponding angular velocity, until the linear velocity is determined to be at least a predefined percentage to an initial linear velocity (proximal to the initial linear velocity) of the autonomous vehicle recorded at the predefined distance. Further, the method includes generating one or more trajectories corresponding to each of the one or more co-efficient value sets based on the position co-ordinates and the orientation determined at the plurality of time instances. Furthermore, the method includes determining an optimal trajectory for the navigation of the autonomous vehicle based on weightage of each of the one or more trajectories. The weightage of each of the one or more trajectories is computed based on cumulative variation in the orientation required for navigating along the corresponding trajectory and total time required for navigating along the corresponding trajectory. Finally, the method includes providing the determined optimal trajectory to a navigation module associated with the trajectory determining system to navigate the autonomous vehicle.

Further, the present disclosure includes a trajectory determining system for determining an optimal trajectory for navigation of an autonomous vehicle. The trajectory determining system includes a processor and a memory communicatively coupled to the processor. The memory stores the processor-executable instructions, which, on execution, causes the processor to detect an occurrence of a predefined condition related to diversion of the autonomous vehicle from a planned navigation path, based on environment data received from one or more sensors configured in the autonomous vehicle. Further, the processor determines a minimum lateral shift required from a predefined distance for handling the detected predefined condition. Upon determining the minimum lateral shift, the processor determines one or more co-efficient value sets corresponding to the minimum lateral shift by comparing the minimum lateral shift with pre-stored values. The pre-stored values are generated based on a trial run of the autonomous vehicle under one or more predefined trial conditions of the autonomous vehicle. Subsequently, the processor determines for each of the one or more co-efficient value sets, a linear velocity and an angular velocity at a plurality of time instances using each of the one or more co-efficient value sets, and position co-ordinates and orientation at the corresponding time instances using the corresponding linear velocity and the corresponding angular velocity, until the linear velocity is determined to be at least a predefined percentage to an initial linear velocity (i.e. proximal to the initial linear velocity) of the autonomous vehicle recorded at the predefined distance. Further, the processor generates one or more trajectories corresponding to each of the one or more co-efficient value sets based on the position co-ordinates and the orientation determined at the plurality of time instances. Furthermore, the processor determines an optimal trajectory for the navigation of the autonomous vehicle based on weightage of each of the one or more trajectories. The weightage of each of the one or more trajectories is computed based on cumulative variation in the orientation required for navigating along the corresponding trajectory and total time required for navigating along the corresponding trajectory. Finally, the processor provides the determined optimal trajectory to a navigation module associated with the trajectory determining system to navigate the autonomous vehicle.

Furthermore, the present disclosure comprises a non-transitory computer readable medium including instructions stored thereon that when processed by at least one processor causes a trajectory determining system to perform operations including detecting an occurrence of a predefined condition related to diversion of the autonomous vehicle from a planned navigation path, based on environment data received from one or more sensors configured in the autonomous vehicle. Further, the instructions cause the processor to determine a minimum lateral shift required from a predefined distance for handling the detected predefined condition. Upon determining the minimum lateral shift, the instructions cause the processor to determining one or more co-efficient value sets corresponding to the minimum lateral shift by comparing the minimum lateral shift with pre-stored values. The pre-stored values are generated based on a trial run of the autonomous vehicle under one or more predefined trial conditions of the autonomous vehicle. Further, the instructions cause the processor to determine for each of the one or more co-efficient value sets, a linear velocity and an angular velocity at a plurality of time instances using each of the one or more co-efficient value sets and subsequently determine position co-ordinates and orientation at the corresponding time instances using the corresponding linear velocity and the corresponding angular velocity. The determination continues until the linear velocity is determined to be at least a predefined percentage to an initial linear velocity of the autonomous vehicle recorded at the predefined distance. Further, the instructions cause the processor to generate one or more trajectories corresponding to each of the one or more co-efficient value sets based on the position co-ordinates and the orientation determined at the plurality of time instances. Furthermore, the instructions cause the processor to determine an optimal trajectory for the navigation of the autonomous vehicle based on weightage of each of the one or more trajectories. The weightage of each of the one or more trajectories is computed based on cumulative variation in the orientation required for navigating along the corresponding trajectory and total time required for navigating along the corresponding trajectory. Finally, the instructions cause the processor to provide the determined optimal trajectory to a navigation module associated with the trajectory determining system to navigate the autonomous vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
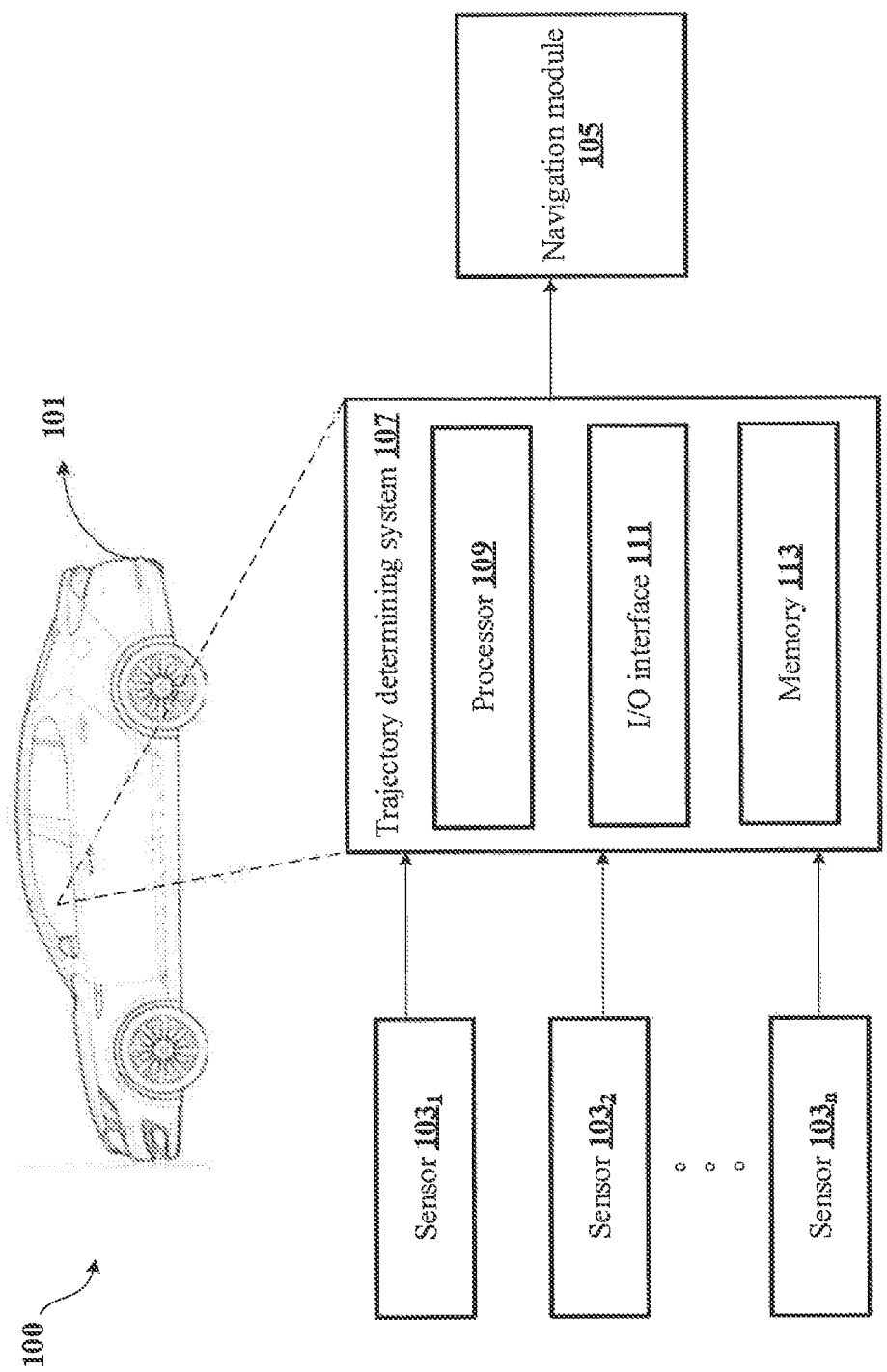
FIG. 1A shows an exemplary architecture for determining an optimal trajectory for navigation of an autonomous vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for determining an optimal trajectory for navigation of an autonomous vehicle. A trajectory determining system associated with the autonomous vehicle may receive environment data from one or more sensors configured in the autonomous vehicle. As an example, the one or more sensors may include, hut not limited to, Light Detection and Ranging (LIDAR) system, image capturing devices and Global Positioning System (GPS). Based on the environment data, the trajectory determining system may determine an occurrence of a predefined condition related to diversion of the autonomous vehicle. As an example, the predefined condition related to the autonomous vehicle may include, but not limited to, a presence of an obstacle in a planned navigation path, a requirement for changing a lane or a requirement for realigning to the planned navigation path. When the predefined condition related diversion occurs, the trajectory determining system may determine a minimum lateral shift required for handling the predefined condition from a predefined distance. Accordingly, the trajectory determining system may determine linear velocity and angular velocity, using which position co-ordinates and orientation of the autonomous vehicle are determined for each of one or more co-efficient value sets corresponding to the minimum lateral shift at a plurality of time instances. In an embodiment, the one or more co-efficient value sets may be determined using pre-stored values that are generated based on a trial run of the autonomous vehicle under one or more predefined trial conditions. Subsequently, for each of the one or more co-efficient value sets, the trajectory determining system may generate one or more trajectories based on the corresponding position co-ordinates and the orientation. Further, the trajectory determining system may determine weightage of each of the one or more trajectories based on cumulative variation in orientation and total time required for travel along the corresponding trajectory. Among the one or more generated trajectories, an optimal trajectory for navigation of the autonomous vehicle may be determined based on the weightage of each of the one or more trajectories.

Firstly, since the one or more co-efficient value sets used for determining the linear velocity and the angular velocity, are generated based on the trial run of the autonomous vehicle, the one or more trajectories that are generated are specific to performance and specific needs of the autonomous vehicle. Further, since, the weightage of the one or more trajectories is determined based on cumulative variation in orientation and total time required for travel, the determined optimal trajectory ensures handling the predefined condition such as obstacle avoidance or changing lanes etc., with minimal lateral shift thereby keeping the road less occupied and also reducing the total time of travel and energy usage while handling the predefined condition.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for determining an optimal trajectory for navigation of an autonomous vehicle in accordance with some embodiments of the present disclosure.

The architecture 100 includes an autonomous vehicle 101, one or more sensors, sensor $103_1$ to sensor $103_n$ (collectively referred as one or more sensors 103), a navigation module 105 and a trajectory determining system 107. As an example, the autonomous vehicle 101 may be a bike, a car, a truck, a bus and the like. In an embodiment, the autonomous vehicle 101 may be configured with one or more sensors 103. As an example, the one or more sensors 103 may include, but not limited to, Light Detection and Ranging (LIDAR) system, image capturing devices and Global Positioning System (GPS). Further, the one or more sensors 103 may be detachable from the autonomous vehicle 101 and repositioned at any predefined position on the autonomous vehicle 101. In some embodiments, the one or more sensors 103 may be remotely associated with the autonomous vehicle 101. In some embodiments, the one or more sensors 103 may be associated with the trajectory determining system 107 via a communication network (not shown in FIG. 1). As an example, the communication network may include a wired communication network or a wireless communication network. In some embodiments, the trajectory determining system 107 may be configured within the autonomous vehicle 101 as shown in the FIG. 1.

The trajectory determining system 107 includes a processor 109, an Input/Output (I/O) interface 111 and a memory 113. The I/O interface 111 may be configured to receive environment data from the one or more sensors 103, in real-time. As an example, the environment data may include, but not limited to, current position of the autonomous vehicle 101, static objects such as trees, poles, rocks etc. and dynamic objects such as vehicles, humans, etc. that appear on a planned navigation path along which the autonomous vehicle 101 is currently navigating and terrain condition along the planned navigation path. In some embodiments, the one or more sensors 103 may provide static data such as static maps of locality where the autonomous vehicle 101 may navigate. Further, the I/O interface 111 may receive an optimal trajectory from the processor 109 for navigation of the autonomous vehicle 101. Further, the processor 109 may store the environment data, the static data and the planned navigation path in the memory 113 coupled with the processor 109.

In some embodiments, when the autonomous vehicle 101 is navigating along the pre-generated navigation path, the processor 109 may select a segment among one or more segments in the planned navigation path. In some embodiments, the processor 109 may generate the one or more segments dynamically based on a Field of View (FOV) of sensors 103 such as image capturing devices, LIDAR and the like, configured in the autonomous vehicle 101. As an example, a part of the planned navigation path which extends up to the FOV from a current position of the autonomous vehicle 101, may be generated and selected as the segment. Alternatively, in some embodiments, the one or more segments may be pre-generated based on a predefined distance configured in the trajectory determining system 107. As an example, a part of the planned navigation path that extends up to a predefined distance such as 10 metres, 15 metres and the like, may be selected as the segment. Upon selecting the segment, the processor 109 may provide the segment to the trajectory determining system 107 for determining the optimal trajectory for navigation of the autonomous vehicle 101.

Further, the processor 109 may detect an occurrence of a predefined condition related to diversion of the autonomous vehicle 101 from a planned navigation path, based on the environment data. As an example, the predefined condition related to the diversion may include, but not limited to, a presence of an obstacle in the planned navigation path, a requirement for changing a lane or a requirement for realigning to the planned navigation path. As an example, when an obstacle such as a rock appears on the planned navigation path, the autonomous vehicle 101 may have to divert from the planned navigation path to avoid the obstacle. Furthermore, the processor 109 determines a minimum lateral shift required from a predefined distance for handling the detected predefined condition. As an example, the predefined distance may be 3 metres.

Upon determining the minimum lateral shift, the processor 109 may compare the minimum lateral shift with pre-stored values to determine one or more co-efficient value sets corresponding to the minimum lateral shift. In an embodiment, the pre-stored values may be generated based on a trial run of the autonomous vehicle 101 under one or more predefined trial conditions of the autonomous vehicle 101. As an example, the one or more predefined trial conditions may include, but not limited to, speed of the autonomous vehicle 101, size of an obstacle that triggers diversion of the autonomous vehicle 101, terrain condition where the trial run is conducted such as slope of the road, type of road etc. and shape of a path where the trial run is conducted such as a straight road or a curvy road. In an embodiment, the pre-stored values may include, but not limited to, lateral shift values and a co-efficient value set corresponding to each lateral shift value and approach speed of the autonomous vehicle 101.

Further, the processor 109 may determine for each of the one or more co-efficient value sets, a linear velocity and an angular velocity at a plurality of time instances using each of the one or more co-efficient value sets. In an embodiment, the linear velocity and the angular velocity determined for each of the one or more co-efficient value sets vary in a parabolic pattern. Subsequently, the processor 109 may determine position co-ordinates and orientation at the corresponding time instances using the corresponding linear velocity and the corresponding angular velocity. In an embodiment, the processor 109 may continue to determine the linear velocity, the angular velocity, the position co-ordinates, and the orientation until the linear velocity is determined to be at least a predefined percentage to an initial linear velocity of the autonomous vehicle 101 recorded at the predefined distance. In some embodiments, the predefined percentage may be 95% i.e. the linear velocity should be at least 95% to the initial linear velocity. In some other embodiments, the predefined percentage could be a range such as 90-95%.

Further, the processor 109 may generate one or more trajectories corresponding to each of the one or more co-efficient value sets based on the position co-ordinates and the orientation determined at the plurality of time instances. Furthermore, the processor 109 may determine an optimal trajectory for the navigation of the autonomous vehicle 101 based on weightage of each of the one or more trajectories. In some embodiments, the weightage of each of the one or more trajectories is computed based on cumulative variation in the orientation and total time required for navigating along the corresponding trajectories. In some embodiments, the determined optimal trajectory may be a tangential trajectory with minimum weightage among the one or more trajectories. Finally, the processor 109 may provide the determined optimal trajectory to a navigation module 105 associated with the trajectory determining system 107 to navigate the autonomous vehicle 101. In some embodiments, the navigation module 105 may be configured in the autonomous vehicle 101.

Figure 2A:
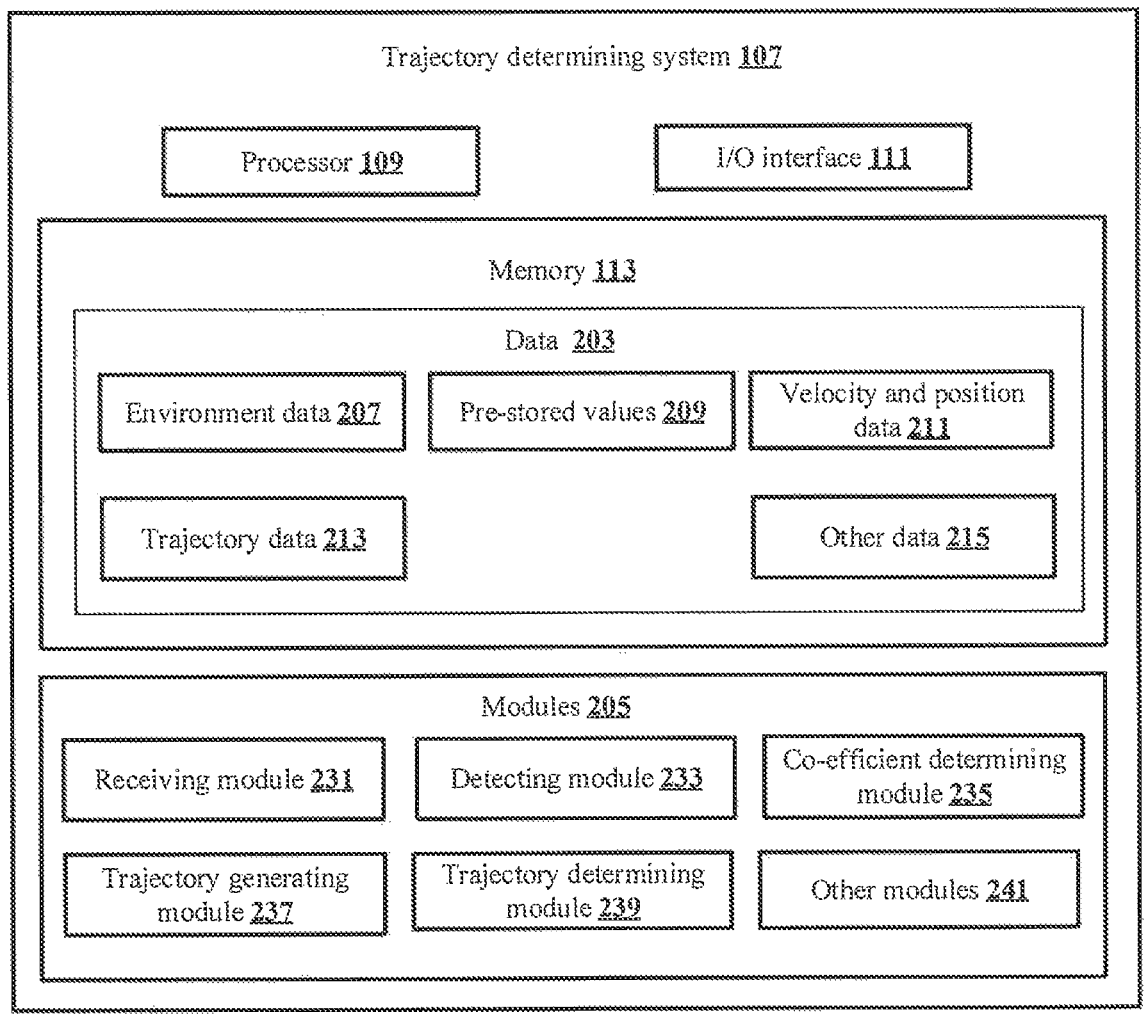
FIG. 2A shows a detailed block diagram of a trajectory determining system for determining an optimal trajectory for navigation of an autonomous vehicle in accordance with some embodiments of the present disclosure.

FIG. 2A shows a detailed block diagram of a trajectory determining system 107 for determining an optimal trajectory for navigation of an autonomous vehicle 101 in accordance with some embodiments of the present disclosure.

In some implementations, the trajectory determining system 107 may include data 203 and modules 205. As an example, the data 203 is stored in a memory 113 configured in the trajectory determining system 107 as shown in the FIG. 2A. In one embodiment, the data 203 may include environment data 207, pre-stored values 209, velocity and position data 211, trajectory data 213 and other data 215. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 215 may store data, including temporary data and temporary files, generated by the modules 205 for performing the various functions of the trajectory determining system 107.

In some embodiments, the data 203 stored in the memory 113 may be processed by the modules 205 of the trajectory determining system 107. The modules 205 may be stored within the memory 113. In an example, the modules 205 communicatively coupled to the processor 109 configured in the trajectory determining system 107, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 231, a detecting module 233, a co-efficient determining module 235, a trajectory generating module 237, a trajectory determining module 239 and other modules 241. The other modules 241 may be used to perform various miscellaneous functionalities of the trajectory determining system 107. It will be appreciated that such aforementioned modules 205 may be represented as a single module or a combination of different modules.

In some embodiments, the receiving module 231 may receive environment data 207 from one or more sensors 103 configured in the autonomous vehicle 101. As an example, the environment data 207 may include, but not limited to, current position of the autonomous vehicle 101, static objects such as trees, poles, rocks etc. and dynamic objects such as vehicles, humans, etc. that appear on a planned navigation path along which the autonomous vehicle 101 is currently navigating and terrain condition along the planned navigation path. As an example, the one or more sensors 103 may include, but not limited to, Light Detection and Ranging (LIDAR) system, image capturing devices and Global Positioning System (GPS).

In some embodiments, the detecting module 233 may detect an occurrence of a predefined condition related to diversion of the autonomous vehicle 101 from a planned navigation path, based on the environment data 207. As an example, the predefined condition related to the diversion may include, but not limited to, a presence of an obstacle in the planned navigation path, a requirement for changing a lane or a requirement for realigning to the planned navigation path.

Figure 2B:
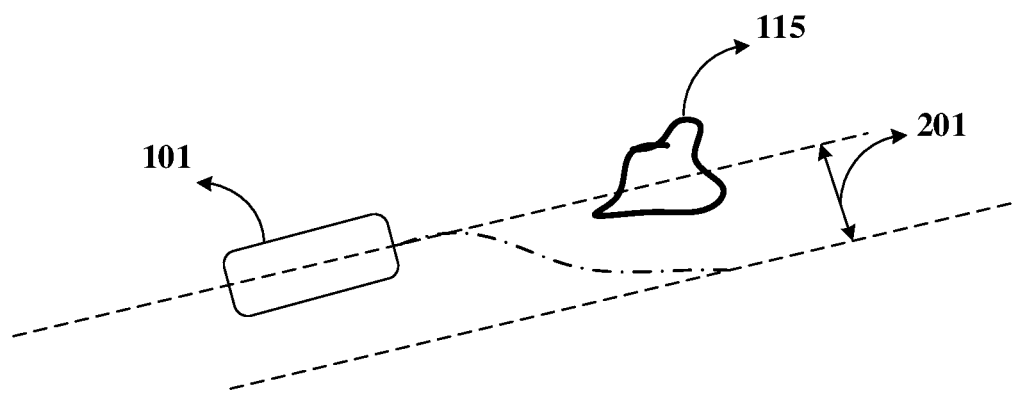
FIG. 2B and FIG. 2C show exemplary representations of lateral shifts for handling a predefined condition related to diversion, in accordance with some embodiments of the present disclosure.
Figure 2C:
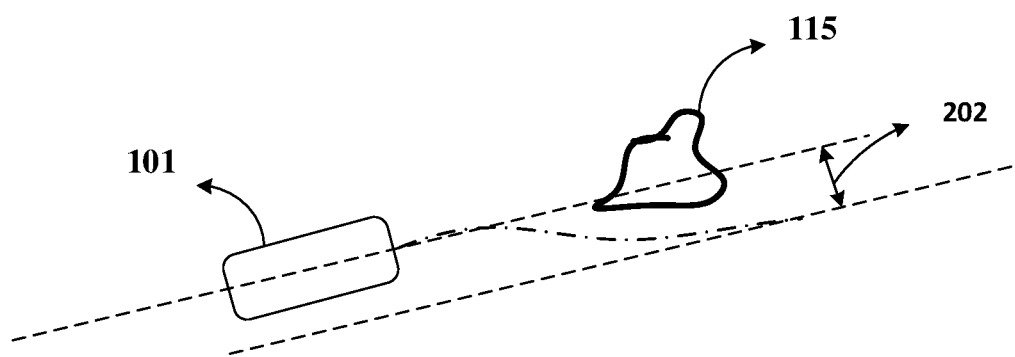

In some embodiments, the co-efficient determining module 235 may determine a minimum lateral shift required from a predefined distance for handling the detected predefined condition. As an example, the predefined distance may be 3 metres. In some embodiments, lateral shift required for handling the predefined condition related to the diversion may depend on factors such as the speed of the autonomous vehicle 101, size of the obstacle, contour co-ordinates of the obstacle, terrain condition and the like. The co-efficient determining module 235 may receive the above mentioned factors from the one or more sensors 103 configured in the autonomous vehicle 101. FIG. 2B and FIG. 2C illustrate two different lateral shifts that may be applicable for handling the detected predefined condition i.e. bypassing the obstacle 115. FIG. 2B illustrates an exemplary lateral shift 201 when the obstacle 115 is bypassed slowly and FIG. 2C illustrates an exemplary lateral shift 202 when the obstacle 115 is bypassed fast. Therefore, among all the lateral shifts that could be applied for handling the predefined condition, the co-efficient determining module 235 may determine the minimum lateral shift that would be sufficient for handling the predefined condition such as bypassing an obstacle 115. Further, the co-efficient determining module 235 may compare the minimum lateral shift with pre-stored values 209 to determine one or more co-efficient value sets corresponding to the minimum lateral shift.

In an embodiment, the pre-stored values may be generated based on a trial run of the autonomous vehicle 101 under one or more predefined trial conditions of the autonomous vehicle 101. As an example, the one or more predefined trial conditions may include, but not limited to, speed of the autonomous vehicle 101, size of an obstacle 115 that triggers diversion of the autonomous vehicle 101, terrain condition where the trial run is conducted such as slope of the road, type of road etc. and shape of a path where the trial run is conducted such as a straight road or a curvy road. In an embodiment, the pre-stored values may include, but not limited to, lateral shift values and a co-efficient value set corresponding to each lateral shift value and approach speed (also referred as initial speed) of the autonomous vehicle 101. During the trial run, the autonomous vehicle 101 may be manually steered to handle the predefined condition, based on which different sets of linear-angular velocity pairs may be recorded for determining corresponding set of co-efficient values. In some embodiments, for the same measure of hindrance and the same predefined environment condition, requirement of different lateral shift and corresponding linear-angular velocity pairs can be observed due to initial speed of the autonomous vehicle 101. The variation of linear-angular velocity may be parabolic in nature, therefore, each co-efficient set may include 3 co-efficient value corresponding to the linear velocity and 3 co-efficient values corresponding to the angular velocity. As an example, (a, b, c) or (a', b', c') may be the co-efficient values corresponding to the linear velocity and (A, B, C) or (A', B', C') may be the co-efficient values corresponding to angular velocity.

During the trial run, for each time instance, linear velocity and angular velocity is determined i.e. $(V_L, t)$ and $(V_R, t)$ while manually steering the autonomous vehicle 101 to handle the predefined condition related to diversion. For each linear velocity-time pair, the co-efficient values may be determined using the below Equation 1.

$$V_L = a*t^2 + b*t + c \qquad \text{Equation 1}$$

In the above Equation 1,
$V_L$ indicates linear velocity;
t indicates time instance; and
a, b and c indicate co-efficient values corresponding to linear velocity.

Similarly, for each angular velocity-time pair, the co-efficient values may be determined using the below Equation 2.

$$V_R = A*t^2 + B*t + C \qquad \text{Equation 2}$$

$V_R$ indicates angular velocity;
t indicates time instance; and
A, B and C indicate co-efficient values corresponding to angular velocity.

The below Table 1 shows exemplary co-efficient values for a certain lateral shift and initial speed of the autonomous vehicle 101.

TABLE 1

| | Lateral shift = D1 (Ex. 1 meter) | | | | | |
|---|---|---|---|---|---|---|
| Initial speed | Co-efficient values for linear speed variation | | | Co-efficient values for angular speed variation | | |
| in m/s | a | b | c | A | B | C |
| V1 = 4 | 32 | −90 | 63.6 | −1.66 | 4.7 | 2 |
| V2 = 3 | — | — | — | — | — | — |

Referring back to the comparison step, where the minimum lateral shift is compared with the pre-stored values to determine the one or more co-efficient value sets corresponding to the minimum lateral shift. Upon determining the one or more co-efficient value sets, the trajectory generating module 237 may determine for each of the one or more co-efficient value sets, a linear velocity and an angular velocity at a plurality of time instances using the Equation 1 and Equation 2 respectively. At each subsequent time instance, the linear velocity may decrease and the angular velocity may increase until the lateral shift is achieved to handle the predefined condition related to diversion. Simultaneously, once the lateral shift is achieved and the predefined condition related to the diversion is handled, the lateral shift would subside, thereby increasing the linear velocity and decreasing the angular velocity. This variation pattern of the linear velocity and the angular velocity may be parabolic in nature. Therefore, the trajectory generating module 237 may continue to determine the linear velocity and the angular velocity until the linear velocity at a particular time instance is determined to be at least a predefined percentage to the initial linear velocity (i.e. proximal to the initial linear velocity) of the autonomous vehicle 101 recorded at the predefined distance.

Figure 2D:
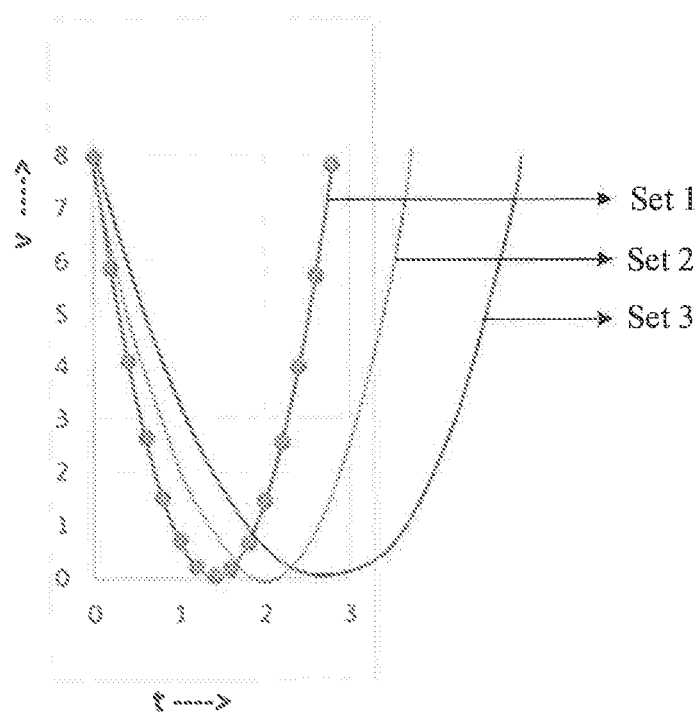
FIG. 2D shows a graph illustrating linear velocity determined at a plurality of time instances in accordance with some embodiments of the present disclosure.

FIG. 2D shows a graph illustrating the linear velocity determined at the plurality of time instances, for 3 different co-efficient value sets, set 1, set 2 and set 3. The graph clearly indicates that the linear velocity gradually decreases with time while handling the predefined condition related to the diversion and gradually increases after the lateral shift is achieved to handle the predefined condition related to the diversion.

Figure 2E:
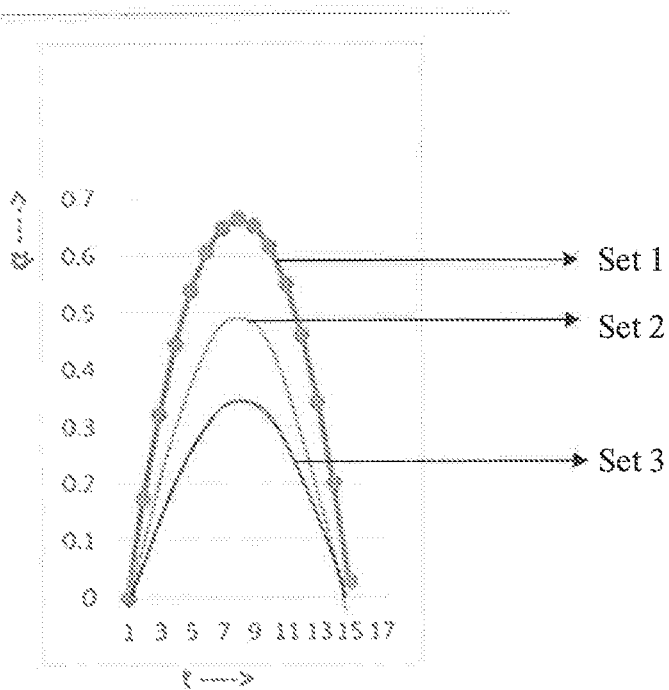
FIG. 2E shows a graph illustrating angular velocity determined at a plurality of time instances in accordance with some embodiments of the present disclosure.

Similarly, FIG. 2E shows a graph illustrating the angular velocity determined at the plurality of time instances, for 3 different co-efficient value sets, set 1, set 2 and set 3. The graph clearly indicates that the angular velocity gradually increases with time while handling the predefined condition related to the diversion and gradually decreases after the lateral shift is achieved to handle the predefined condition related to the diversion.

Further, for the linear velocity and the angular velocity determined at each of the plurality of time instances, the trajectory generating module 237 may determine position co-ordinates (X,Y) and orientation (Z) at the corresponding time instances using the corresponding linear velocity and the corresponding angular velocity.

In some embodiments, the orientation (z) may be determined using the below Equation 3.

$$Z\_new = Z + (vel\_rot) * dt \quad \text{Equation 3}$$

In the above Equation 3,

Z_new indicates new orientation i.e. orientation to be determined;

Z indicates current orientation of the autonomous vehicle 101;

vel_rot indicates angular velocity; and dt indicates the time instance.

In some embodiments, the position co-ordinate along x-axis may be determined using the below Equation 4.

$$X\_new = X + (vel\_lin + \cos(Z) + vel\_rot * \cos(pi/2 + Z)) * dt \quad \text{Equation 4}$$

In the above Equation 4,

X_new indicates new position along x-axis to be determined;

X indicates current position of the autonomous vehicle 101 along x-axis;

Z indicates current orientation of the autonomous vehicle 101;

dt indicates the time instance;

Vel_lin indicates linear velocity;

Vel_rot indicates angular velocity; and

Pi indicates a mathematical constant of value approximately 3.14.

In some embodiments, the position co-ordinate along y-axis may be determined using the below Equation 5.

$$Y\_new = Y + (vel\_lin + \sin(Z) + vel\_rot * \sin(pi/2 + Z)) * dt \quad \text{Equation 5}$$

In the above Equation 5,

Y_new indicates new position along y-axis to be determined;

Y indicates current position of the autonomous vehicle 101 along y-axis;

Z indicates current orientation of the autonomous vehicle 101;

dt indicates the time instance;

Vel_lin indicates linear velocity;

Vel_rot indicates angular velocity;

Pi indicates a mathematical constant of value approximately 3.14.

The below Table 2 shows exemplary values of linear velocity, angular velocity, position co-ordinates and orientation at the plurality of time instances for a particular set of co-efficient values.

TABLE 2

| Time | vel_linear | vel_rot | X | Z | Y |
|---|---|---|---|---|---|
| T | at*t + bt + c | At*t + Bt + C | 2 | 0.09 | 0.4 |
| t1 = 0 | 7.95 | 0 | 3.583564845 | 0.124944 | 0.542906893 |
| t2 = 0.2 | 5.86 | 0.17472 | 4.742101611 | 0.154576 | 0.723635617 |
| t3 = 0.4 | 4.09 | 0.32288 | 5.540457132 | 0.178896 | 0.913389803 |
| t4 = 0.6 | 2.64 | 0.44448 | 6.044281862 | 0.197904 | 1.094833721 |
| t5 = 0.8 | 1.51 | 0.53952 | 6.31925582 | 0.2116 | 1.260026018 |
| t6 = 1 | 0.7 | 0.608 | 6.430688983 | 0.219984 | 1.408337594 |
| t7 = 1.2 | 0.21 | 0.64992 | 6.443413517 | 0.223056 | 1.544376638 |
| t8 = 1.4 | 0.04 | 0.66528 | 6.421885222 | 0.220816 | 1.675929391 |
| t9 = 1.6 | 0.19 | 0.65408 | 6.430412108 | 0.213264 | 1.811914814 |
| t10 = 1.8 | 0.66 | 0.61632 | 6.533428671 | 0.2004 | 1.960344983 |
| tn-4 = 2 | 1.45 | 0.552 | 6.7957347 | 0.182224 | 2.126280807 |
| tn-3 = 2.2 | 2.56 | 0.46112 | 7.282617222 | 0.158736 | 2.309774348 |
| tn-2 = 2.4 | 3.99 | 0.34368 | 8.059773601 | 0.129936 | 2.50379486 |
| tn-1 = 2.6 | 5.74 | 0.19968 | 9.192953178 | 0.095824 | 2.692145458 |
| tn = 2.8 | 7.81 | 0.02912 | | | |

In the above Table 2, value of linear velocity at time tn is 7.81. The value at time tn is proximal (more than a predefined percentage) to the initial linear velocity at time t1, which is 7.95. Therefore, for a given co-efficient value set, the trajectory generating module 237 may determine the linear and angular velocities, position co-ordinates and orientation until the time instance at which the determined linear velocity is proximal to the initial linear velocity.

Figure 2F:
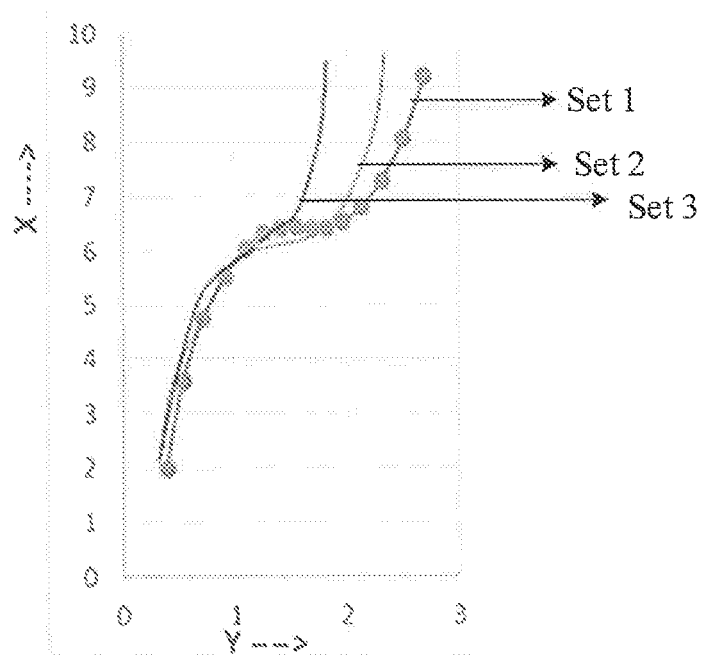
FIG. 2F shows a graph illustrating position co-ordinates determined at a plurality of time instances in accordance with some embodiments of the present disclosure.
Figure 2G:
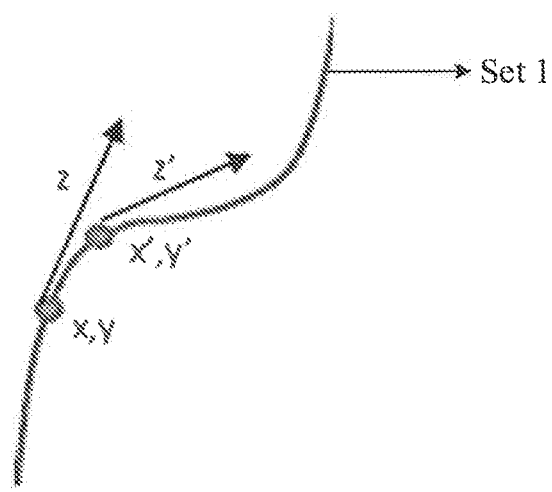
FIG. 2G shows orientation of an autonomous vehicle for corresponding position co-ordinates in accordance with some embodiments of the present disclosure.

FIG. 2F shows a graph illustrating the position co-ordinates determined at the plurality of time instances, for 3 different co-efficient value sets, set 1, set 2 and set 3. The circular dots on curve corresponding to set 1, indicate the position co-ordinates $(X_0, Y_0)$ to $(Xn, Yn)$. Further, FIG. 2G shows orientation (Z) of the autonomous vehicle 101 for the corresponding position co-ordinates.

In some embodiments, the linear velocity, angular velocity, position co-ordinates and orientation of the autonomous vehicle 101 at plurality of time instances, for each of the one or more co-efficient value sets may be stored as the velocity and position data 211.

Further, upon determining the linear velocity, angular velocity, position co-ordinates and orientation of the autonomous vehicle 101 at plurality of time instances, for each of the one or more co-efficient value sets, the trajectory generating module 237 may generate one or more trajectories corresponding to each of the one or more co-efficient value sets. In some embodiments, the trajectory generating module 237 may generate the one or more trajectories based on the position co-ordinates and the orientation of the autonomous vehicle 101 determined at the plurality of time instances.

Further, the trajectory determining module 239 may determine an optimal trajectory for the navigation of the autonomous vehicle 101 based on weightage of each of the one or more trajectories. In some embodiments, the trajectory determining module 239 may determine the weightage of each of the one or more trajectories based on the orientation and the plurality of time instances corresponding to each of the one or more trajectories. More specifically, the trajectory determining module 239 may determine the weightage of each of the one or more trajectories based on cumulative variation in the orientation required for navigating along the corresponding trajectory and total time required for navigating along the corresponding trajectory. In some embodiments, the weightage may be inversely proportional to the cumulative variation in the orientation required for navigating along the corresponding trajectory and the total time required for navigating along the corresponding trajectory.

In some embodiments, the trajectory determining module 239 may determine cumulative variation in the orientation required for navigating along a trajectory using the below Equation 6.

$$Ot = (Z2-Z1) + (Z3-Z2) + \ldots (Zn-Zn-1) \qquad \text{Equation 6}$$

In the above Equation 6,

Ot indicates the cumulative variation in the orientation; and

Z1, Z2 ... Zn indicate orientation of the autonomous vehicle 101 on the corresponding trajectory at a plurality of time instances starting from t1 to tn.

In some embodiments, the trajectory determining module 239 may determine total time required for navigating along a trajectory using the below Equation 7.

$$t_{total} = t_n - t_1 \qquad \text{Equation 7}$$

In the above Equation 7, $t_{total}$ indicates total time required for navigating along the trajectory; and $t_1$ to $t_n$ indicate the plurality of time instances.

In some embodiments, the trajectory determining module 239 may use width and length of the autonomous vehicle 101 also as key factors in determining the optimal trajectory in certain scenarios. As an example, consider a scenario where the predefined condition related to diversion is detected to be presence of an obstacle 115. As an example, the obstacle 115 may be a tree, a rock, another vehicle on the road and the like. Therefore, to bypass the obstacle 115, the trajectory determining module 239 may determine the optimal trajectory considering the width and length of the autonomous vehicle 101 in order to ensure maintenance of a safe distance from the obstacle 115 while navigating along the trajectory. In some embodiments, a distance between the trajectory and the obstacle 115 may be considered as the safe distance when the distance between centre of the autonomous vehicle 101 and contour points of the obstacle 115 that lie towards the autonomous vehicle 101, may be 1.5 to 2.5 times the width of the autonomous vehicle 101. Therefore, the measure 1.5 times to 2.5 times of the width of the autonomous vehicle 101 may be referred as predefined threshold distance. In some embodiments, the predefined threshold distance may include an upper cut off value and a lower cut off value. As an example, 1.5 times the width may be a lower cut off value and 2.5 times the width may be an upper cut off value. In some embodiments, the predefined threshold distance may be user defined.

In some embodiments, the trajectory determining module 239 may determine an average distance between contour of the obstacle 115 and each of the one or more trajectories generated by the trajectory generating module 237, when the predefined condition is detected to be presence of the obstacle 115. The trajectory determining module 239 may determine the average distance using the below Equation 8.

$$D_{avg} = (\text{sqrt}((x_5-m_1)^2+(y_5-n_1)^2) + \text{sqrt}((x_5-m_2)^2+(y_5-n_2)^2) + \text{sqrt}((x_5-m_3)^2+(y_5-n_3)^2) \ldots \text{sqrt}((x_5-m_M)^2+(y_5-n_M)^2))/M \qquad \text{Equation 8}$$

In the above Equation 8, $D_{avg}$ indicates the average distance between contour of the obstacle 115 and each of the one or more trajectories;

m and n indicate co-ordinates of contour of the obstacle 115;

$x_5$ and $y_5$ indicate centre position co-ordinates of the autonomous vehicle 101 on the corresponding trajectory; and M indicates total number of points among the obstacle 115 and the trajectory in proximity i.e. each of ($\text{sqrt}((x_5-m_1)^2+(y_5-n_1)^2)$) should not exceed the predefined threshold distance.

Further, the trajectory determining module 239 may select the one or more trajectories that are at the safe distance from the contour of the obstacle 115 by comparing the average distance with the predefined threshold distance, for computing the weightage. Finally, the trajectory determining module 239 may determine a trajectory with minimum weightage among the one or more trajectories as the optimal trajectory. In some embodiments, the optimal trajectory may be a tangential trajectory. Further, the one or more trajectories generated by the trajectory generating module 237, the optimal trajectory, the average distance, the cumulative orientation, and the total time of travel may be stored as the trajectory data 213.

Upon determining the optimal trajectory, the processor 109 may provide the optimal trajectory to a navigation module 105 associated with the trajectory determining system 107 for navigating the autonomous vehicle 101. In some embodiments, the navigation module 105 may be configured in the autonomous vehicle 101. The navigation module 105 may generate a realistic velocity based on previous velocity and projected velocity as per trajectory plan. The navigation module 105 may generate the realistic velocity at certain frequency for example, 100 ms and may apply the realistic velocity to autonomous vehicle's 101 wheelbase.

Henceforth, the process of determining an optimal trajectory for navigation of an autonomous vehicle 101 is explained with the help of one or more examples for better understanding of the present disclosure. However, the one or more examples should not be considered as limitation of the present disclosure.

Figure 2H:
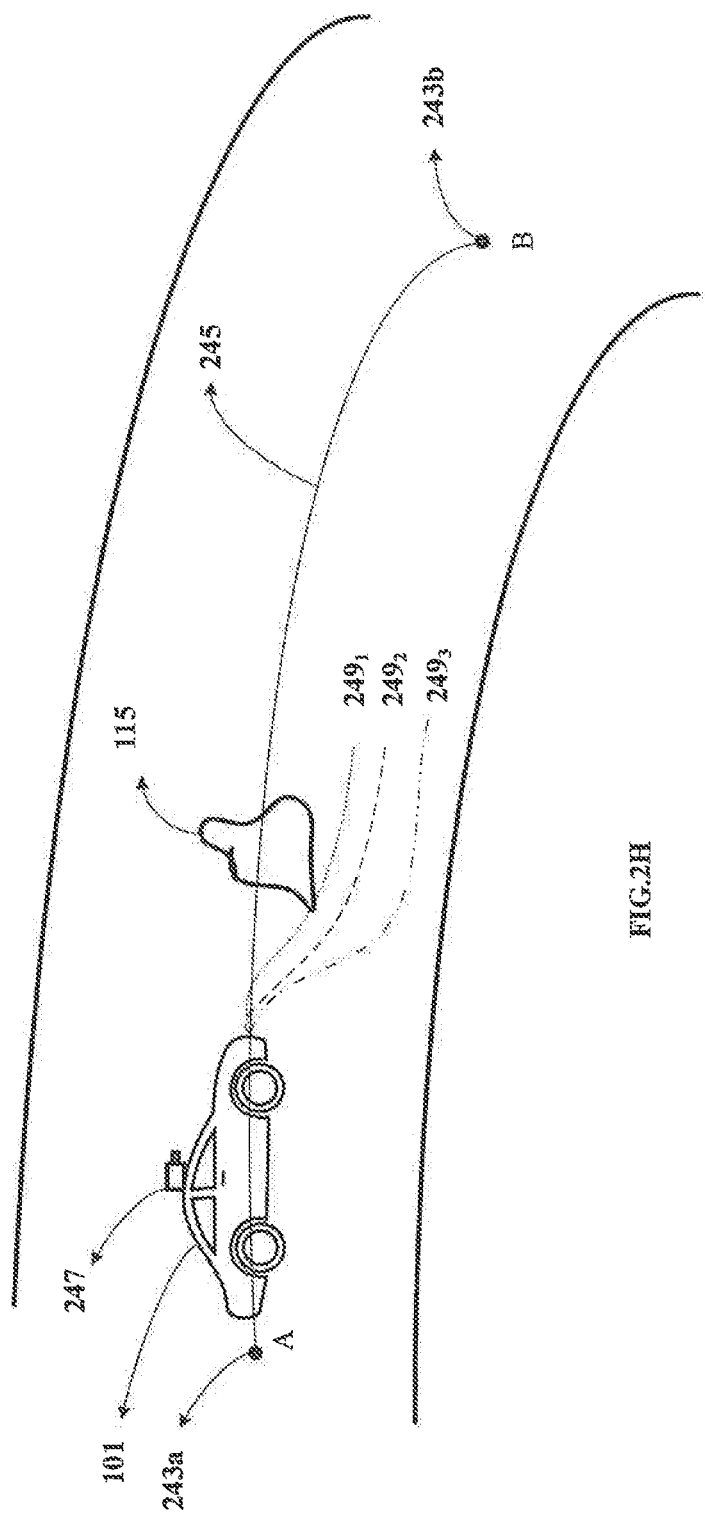
FIG. 2H illustrates an exemplary scenario for determining an optimal trajectory for navigation of an autonomous vehicle in accordance with some embodiments of the present disclosure.

Consider an exemplary scenario as shown in the FIG. 2H, where the autonomous vehicle 101 is a car and is navigating from a source point 243a to destination point 243b through a planned navigation path 245. Further, consider that based on the environment data 207 received from an image capturing device i.e. a camera 247 fixed on top position of the autonomous vehicle 101, the processor 109 may detect a presence of an obstacle 115 in current segment (for example, 10 metres stretch from current position of the autonomous vehicle 101) of the planned navigation path 245. As shown in the FIG. 2H, the obstacle 115 detected by the processor 109 is a big rock.

Consider the following:
Initial speed of the autonomous vehicle: 4 metres/second
Minimum lateral shift required for bypassing the obstacle 115: 1 metre Based on the initial speed and the minimum lateral shift, the processor 109 may determine 3 co-efficient value sets. An exemplary co-efficient value set is shown below.

Co-efficient value set 1:
a=32, b=−90, c=63.6 and
A=−1.66, B=4.7 C=2

Upon determining the co-efficient value sets, the processor 109 may determine the velocity and position data 211 i.e. linear velocity, the angular velocity, the position co-ordinates and the orientation of the autonomous vehicle 101 at a plurality of time instances, for each of the co-efficient value sets. Further, the processor 109 may generate the one or more trajectories based on the velocity and position data 211. The one or more trajectories generated by the processor 109 are indicated in the FIG. 2H as trajectory $249_1$, trajectory $249_2$ and trajectory $249_3$.

The processor 109 may determine average distance of each of the one or more trajectories from the contour of the obstacle 115. Consider the average distance is 3.5 metres which lies within the upper cut off value and the lower cut off value of the predefined threshold distance. However, trajectory $249_1$ individually is not at a safe distance from the obstacle 115. Therefore, only the trajectory $249_2$ and the trajectory $249_3$ are determined to be at a safe distance from the obstacle 115 and selected for determining weightage. Further, the processor 109 determines the cumulative orientation variation for navigating and total time for navigating along each of the one or more trajectories, in order to determine weightage of each of the one or more trajectories. Consider that the weightage of trajectory $249_2$ is $W_2$, and trajectory $249_3$ is $W_3$, among which $W_2$ is the minimum weightage. Therefore, the processor 109 selects trajectory $249_2$ corresponding to the weightage $W_2$ as the optimal trajectory for bypassing the obstacle 115.

Figure 3:
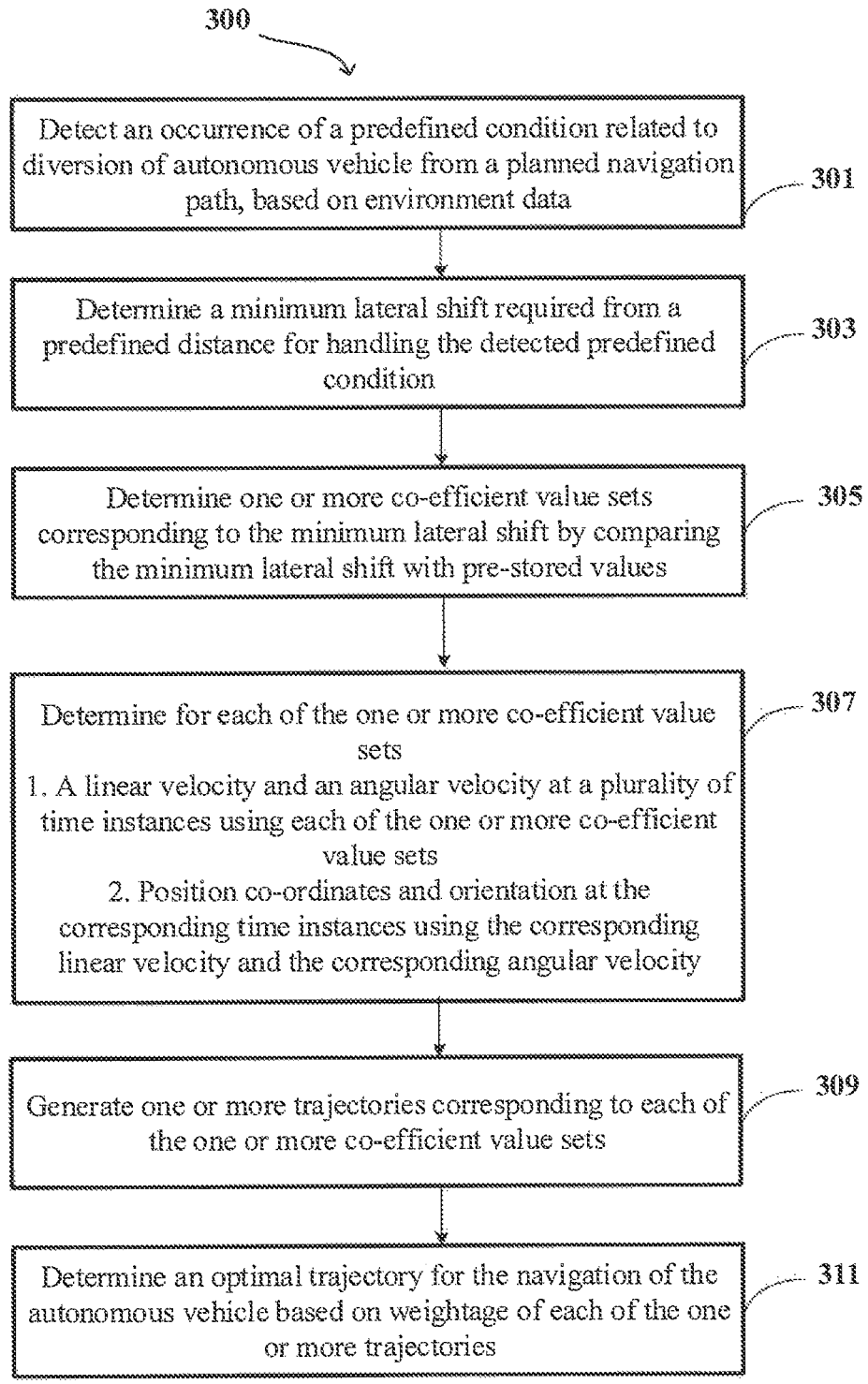
FIG. 3 shows a flowchart illustrating a method of determining an optimal trajectory for navigation of an autonomous vehicle in accordance with some embodiments of the present disclosure.

FIG. 3 shows a flowchart illustrating a method of determining an optimal trajectory for navigation of an autonomous vehicle in accordance with some embodiments of the present disclosure.

As illustrated in FIG. 3, the method 300 includes one or more blocks illustrating a method of determining an optimal trajectory for navigation of an autonomous vehicle 101. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include detecting, by a processor 109 of the trajectory determining system 107, an occurrence of a predefined condition related to diversion of the autonomous vehicle 101 from a planned navigation path, based on environment data 207 received from one or more sensors 103 configured in the autonomous vehicle 101. As an example, the predefined condition related to the diversion may include, but not limited to, a presence of an obstacle 115 in the planned navigation path, a requirement for changing a lane or a requirement for realigning to the planned navigation path.

At block 303, the method 300 may include determining, by the processor 109, a minimum lateral shift required from a predefined distance for handling the detected predefined condition. In some embodiments, lateral shift required for handling the detected predefined condition may depend on factors such as the speed of the autonomous vehicle 101, size of the obstacle 115, contour co-ordinates of the obstacle 115, terrain condition and the like.

At block 305, the method 300 may include, determining, by the processor 109, one or more co-efficient value sets corresponding to the minimum lateral shift by comparing the minimum lateral shift with pre-stored values. In some embodiments, the pre-stored values may be generated based on a trial run of the autonomous vehicle 101 under one or more predefined trial conditions of the autonomous vehicle 101.

At block 307, the method 300 may include, determining for each of the one or more co-efficient value sets, by the processor 109, a linear velocity and an angular velocity at a plurality of time instances using each of the one or more co-efficient value sets, and position co-ordinates and orientation at the corresponding time instances using the corresponding linear velocity and the corresponding angular velocity. In some embodiments, the determination at block 307 may continue until the linear velocity is determined to be at least a predefined percentage to an initial linear velocity (proximal to the initial linear velocity) of the autonomous vehicle 101 recorded at the predefined distance.

At block 309, the method includes, generating, by the processor 109, one or more trajectories corresponding to each of the one or more co-efficient value sets based on the position co-ordinates and the orientation determined at the plurality of time instances.

At block 311, the method includes, determining, by the processor 109, an optimal trajectory for the navigation of the autonomous vehicle 101 based on weightage of each of the one or more trajectories. In some embodiments, the weightage of each of the one or more trajectories may be computed based on a cumulative variation in the orientation required for navigating along the corresponding trajectory and total time required for navigating along the corresponding trajectory. In some embodiments, when the processor 109 detects the predefined condition related to the diversion to be a presence of an obstacle 115, before computing the weightage, the processor 109 may initially determine an average distance between contour of the obstacle 115 and each of the one or more trajectories. Further, the processor 109 may select the one or more trajectories that are at a safe distance from the contour of the obstacle 115 by comparing the average distance with a predefined threshold distance, for computing the weightage. In some embodiments, the determined optimal trajectory is a tangential trajectory.

At block 313, the method includes, providing, by the processor 109, the determined optimal trajectory to a navigation module 105 associated with the trajectory determining system 107 to navigate the autonomous vehicle 101.

Figure 4:
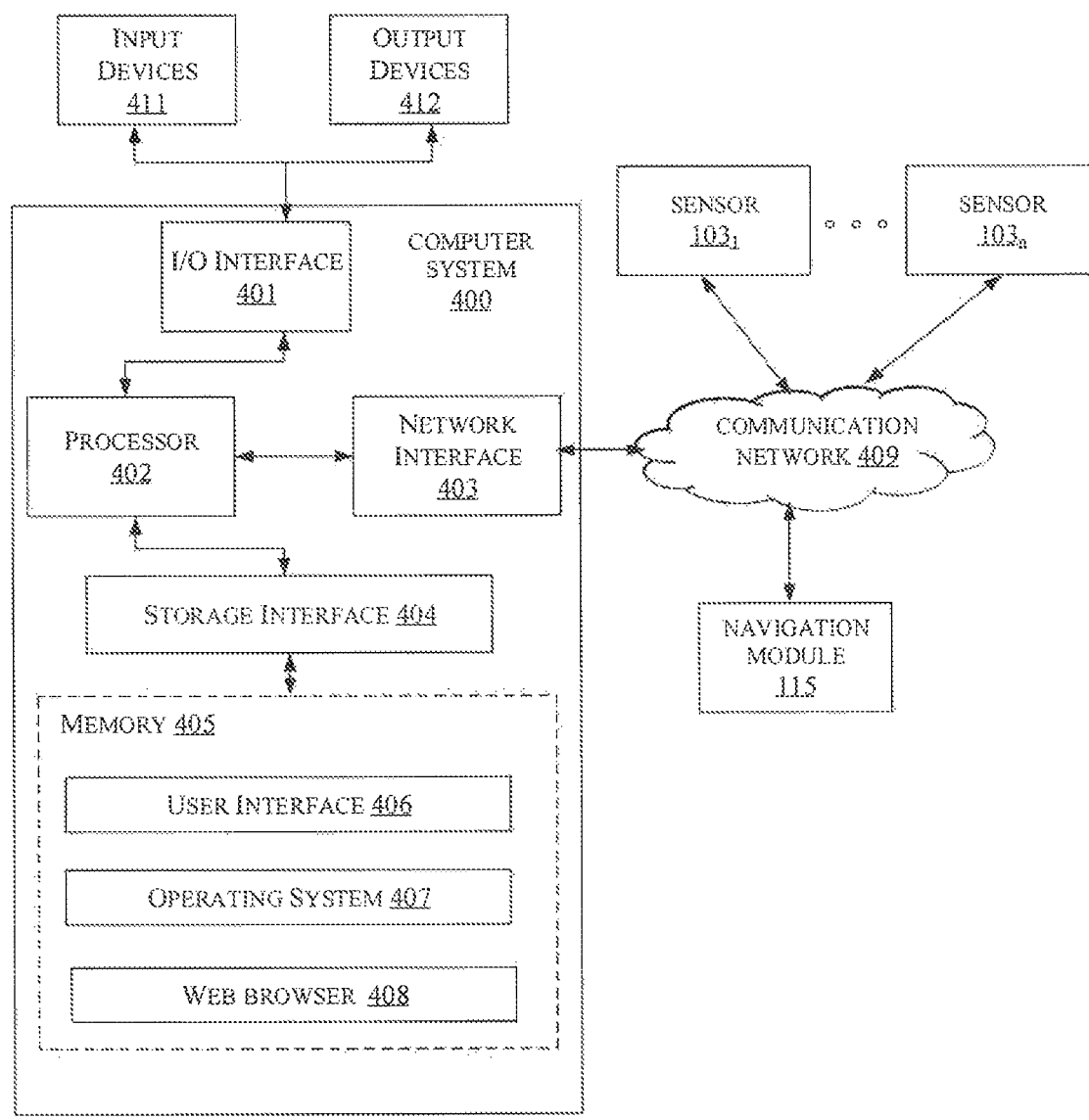
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be trajectory determining system 107 that is used for determining an optimal trajectory for navigation of an autonomous vehicle 101. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more sensors 103 ($103_1$ up to $103_n$), and a navigation module 105. The communication network 409 can be implemented as one of the different types of networks, such as intranet or Local Area Network (LAN), Closed Area Network (CAN) and such within the autonomous vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more sensors 103 may include, but not limited to, Light Detection and Ranging (LIDAR) system, image capturing devices and Global Positioning System (GPS). In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CCI SCRIPTS, JAVA®, JAVA SCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The present disclosure provides a method and a system for determining an optimal trajectory for navigation of an autonomous vehicle.

In the present disclosure, since the one or more co-efficient value sets used for determining the linear velocity and the angular velocity, are generated based on the trial run of the autonomous vehicle, one or more trajectories that are generated are specific to performance and specific needs of the autonomous vehicle.

Further, in the present disclosure, since the weightage of the one or more trajectories is determined based on cumulative variation in orientation and total time for travel, the determined optimal trajectory ensures handling the predefined condition such as obstacle avoidance or changing lanes etc., with minimal lateral shift thereby keeping the road less occupied and also reducing the total time of travel and energy usage along with handling the predefined condition.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for determining an optimal trajectory for navigation of an autonomous vehicle. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERAL

| Reference Number | Description |
| --- | --- |
| 100 | Architecture |
| 101 | Autonomous vehicle |
| 103 | One or more sensors |
| 105 | Navigation module |
| 107 | Trajectory determining system |
| 109 | Processor |
| 111 | I/O interface |
| 113 | Memory |
| 115 | Obstacle |
| 201 | Exemplary lateral shift |
| 203 | Data |
| 205 | Modules |
| 207 | Environment data |
| 209 | Pre-stored values |
| 211 | Velocity and position data |
| 213 | Trajectory data |
| 215 | Other data |
| 231 | Receiving module |
| 233 | Detecting module |
| 235 | Co-efficient determining module |
| 237 | Trajectory generating module |
| 239 | Trajectory determining module |
| 241 | Other modules |
| 243a | Exemplary source point |
| 243b | Exemplary destination point |
| 245 | Exemplary planned navigation path |
| 247 | Exemplary camera |
| $249_1$ | Exemplary trajectory 1 |
| $249_2$ | Exemplary trajectory 2 |
| $249_3$ | Exemplary trajectory 3 |
| 400 | Exemplary computer system |
| 401 | I/O Interface of the exemplary computer system |
| 402 | Processor of the exemplary computer system |
| 403 | Network interface |
| 404 | Storage interface |

-continued

| Reference Number | Description |
| --- | --- |
| 405 | Memory of the exemplary computer system |
| 406 | User interface |
| 407 | Operating system |
| 408 | Web browser |
| 409 | Communication network |
| 411 | Input devices |
| 412 | Output devices |

What is claimed is:

1. A method of determining an optimal trajectory for navigation of an autonomous vehicle, the method comprising:
   detecting, by a trajectory determining system associated with an autonomous vehicle, an occurrence of a predefined condition related to diversion of the autonomous vehicle from a planned navigation path, based on environment data received from one or more sensors configured in the autonomous vehicle;
   determining, by the trajectory determining system, a minimum lateral shift for handling the detected predefined condition related to diversion of the autonomous vehicle from the planned navigation path, based on a speed of the autonomous vehicle;
   determining, by the trajectory determining system, one or more co-efficient value sets corresponding to the minimum lateral shift by comparing the minimum lateral shift with pre-stored values, wherein the pre-stored values are generated based on a trial run of the autonomous vehicle under one or more predefined trial conditions of the autonomous vehicle;
   determining, by the trajectory determining system, for each of the one or more co-efficient value sets,
      a linear velocity and an angular velocity at a plurality of time instances using each of the one or more co-efficient value sets; and
      position co-ordinates and orientation at the corresponding time instances using the corresponding linear velocity and the corresponding angular velocity,
   until the linear velocity is determined to be at least a predefined percentage to an initial linear velocity of the autonomous vehicle recorded at the predefined distance;
   generating, by the trajectory determining system, one or more trajectories corresponding to each of the one or more co-efficient value sets based on the position co-ordinates and the orientation determined at the plurality of time instances;
   determining, by the trajectory determining system, an optimal trajectory for the navigation of the autonomous vehicle based on weightage of each of the one or more trajectories, wherein the weightage of each of the one or more trajectories is computed based on cumulative variation in the orientation required for navigating along the corresponding trajectory and total time required for navigating along the corresponding trajectory;
   providing, by the trajectory determining system, the determined optimal trajectory to a navigation module associated with the trajectory determining system to navigate the autonomous vehicle; and
   controlling, by the navigation module associated with the trajectory determining system, the autonomous vehicle to follow the determined optimal trajectory.

2. The method as claimed in claim 1, wherein the predefined condition related to the diversion comprises at least one of a presence of an obstacle in the planned navigation path, a requirement for changing a lane or a requirement for realigning to the planned navigation path.

3. The method as claimed in claim 1, wherein the one or more predefined trial conditions comprises at least one of speed of the autonomous vehicle, size of an obstacle that triggers diversion of the autonomous vehicle, terrain condition where the trial run is conducted or shape of a path where the trial run is conducted.

4. The method as claimed in claim 1, wherein the pre-stored values comprise at least one of lateral shift values and a co-efficient value set corresponding to each lateral shift value and approach speed of the autonomous vehicle.

5. The method as claimed in claim 1 further comprises:
   determining, by the trajectory determining system, an average distance between a contour of an obstacle and each of the one or more trajectories, when the predefined condition is detected to be presence of the obstacle; and
   selecting, by the trajectory determining system, the one or more trajectories that are at a safe distance from the contour of the obstacle by comparing the average distance with a predefined threshold distance, for computing the weightage.

6. The method as claimed in claim 1, wherein the weightage of the one or more trajectories is proportional to the cumulative variation in the orientation required for navigating along the corresponding trajectory and the total time required for navigating along the corresponding trajectory.

7. The method as claimed in claim 1, wherein a trajectory with minimum weightage among the one or more trajectories is determined to be the optimal trajectory.

8. The method as claimed in claim 1, wherein the linear velocity and the angular velocity determined for each of the one or more co-efficient value sets vary in a parabolic pattern.

9. A trajectory determining system for determining an optimal trajectory for navigation of an autonomous vehicle, the trajectory determining system comprising:
   a processor; and
   a memory communicatively coupled to the processor, wherein the memory stores processor-executable instructions which cause the processor to:
      detect an occurrence of a predefined condition related to diversion of the autonomous vehicle from a planned navigation path, based on environment data received from one or more sensors configured in the autonomous vehicle;
      determine a minimum lateral shift for handling the detected predefined condition related to diversion of the autonomous vehicle from the planned navigation path, based on a speed of the autonomous vehicle;
      determine one or more co-efficient value sets corresponding to the minimum lateral shift by comparing the minimum lateral shift with pre-stored values, wherein the pre-stored values are generated based on a trial run of the autonomous vehicle under one or more predefined trial conditions of the autonomous vehicle;
      determine for each of the one or more co-efficient value sets,
         a linear velocity and an angular velocity at a plurality of time instances using each of the one or more co-efficient value sets; and position co-ordinates and orientation at the corresponding time instances using the corresponding linear velocity and the corresponding angular velocity, until the linear velocity is determined to be at least a predefined percentage to an initial linear velocity of the autonomous vehicle recorded at the predefined distance;

generate one or more trajectories corresponding to each of the one or more co-efficient value sets based on the position co-ordinates and the orientation determined at the plurality of time instances;

determine an optimal trajectory for the navigation of the autonomous vehicle based on weightage of each of the one or more trajectories, wherein the weightage of each of the one or more trajectories is computed based on cumulative variation in the orientation required for navigating along the corresponding trajectory and total time required for navigating along the corresponding trajectory;

provide the determined optimal trajectory to a navigation module associated with the trajectory determining system to navigate the autonomous vehicle; and the navigation module associated with the trajectory determining system configured to control the autonomous vehicle to follow the determined optimal trajectory.

10. The trajectory determining system as claimed in claim 9, wherein the predefined condition related to the diversion comprises at least one of a presence of an obstacle in the planned navigation path, a requirement for changing a lane or a requirement for realigning to the planned navigation path.

11. The trajectory determining system as claimed in claim 9, wherein the one or more predefined trial conditions comprises at least one of speed of the autonomous vehicle, size of an obstacle that triggers diversion of the autonomous vehicle, terrain condition where the trial run is conducted or shape of a path where the trial run is conducted.

12. The trajectory determining system as claimed in claim 9, wherein the pre-stored values comprise at least one of lateral shift values and a co-efficient value set corresponding to each lateral shift value and approach speed of the autonomous vehicle.

13. The trajectory determining system as claimed in claim 9, wherein the processor is further configured to:

determine an average distance between a contour of an obstacle and each of the one or more trajectories, when the predefined condition is detected to be presence of the obstacle; and select the one or more trajectories that are at a safe distance from the contour of the obstacle by comparing the average distance with a predefined threshold distance, for computing the weightage.

14. The trajectory determining system as claimed in claim 9, wherein the weightage of the one or more trajectories is proportional to the cumulative variation in the orientation required for navigating along the corresponding trajectory and the total time required for navigating along the corresponding trajectory.

15. The trajectory determining system as claimed in claim 9, wherein the processor determines a trajectory with minimum weightage among the one or more trajectories to be the optimal trajectory.

16. The trajectory determining system as claimed in claim 9, wherein the linear velocity and the angular velocity determined for each of the one or more co-efficient value sets vary in a parabolic pattern.

17. A non-transitory computer readable medium including instructions stored thereon that when processed by at least one processor causes a trajectory determining system to perform operations comprising:

detecting an occurrence of a predefined condition related to diversion of an autonomous vehicle from a planned navigation path, based on environment data received from one or more sensors configured in the autonomous vehicle;

determining a minimum lateral shift for handling the detected predefined condition related to diversion of the autonomous vehicle from the planned navigation path, based on a speed of the autonomous vehicle;

determining one or more co-efficient value sets corresponding to the minimum lateral shift by comparing the minimum lateral shift with pre-stored values, wherein the pre-stored values are generated based on a trial run of the autonomous vehicle under one or more predefined trial conditions of the autonomous vehicle;

determining for each of the one or more co-efficient value sets, a linear velocity and an angular velocity at a plurality of time instances using each of the one or more co-efficient value sets; and position co-ordinates and orientation at the corresponding time instances using the corresponding linear velocity and the corresponding angular velocity, until the linear velocity is determined to be at least a predefined percentage to an initial linear velocity of the autonomous vehicle recorded at the predefined distance;

generating one or more trajectories corresponding to each of the one or more co-efficient value sets based on the position co-ordinates and the orientation determined at the plurality of time instances;

determining an optimal trajectory for the navigation of the autonomous vehicle based on weightage of each of the one or more trajectories, wherein the weightage of each of the one or more trajectories is computed based on cumulative variation in the orientation required for navigating along the corresponding trajectory and total time required for navigating along the corresponding trajectory;

providing the determined optimal trajectory to a navigation module associated with the trajectory determining system to navigate the autonomous vehicle; and controlling, by the navigation module associated with the trajectory determining system, the autonomous vehicle to follow the determined optimal trajectory.

* * * * *